Jan. 31, 1939.   B. F. GROHMANN   2,145,511
WIND DRIVEN BATTERY CHARGER
Filed March 1, 1938   3 Sheets—Sheet 2
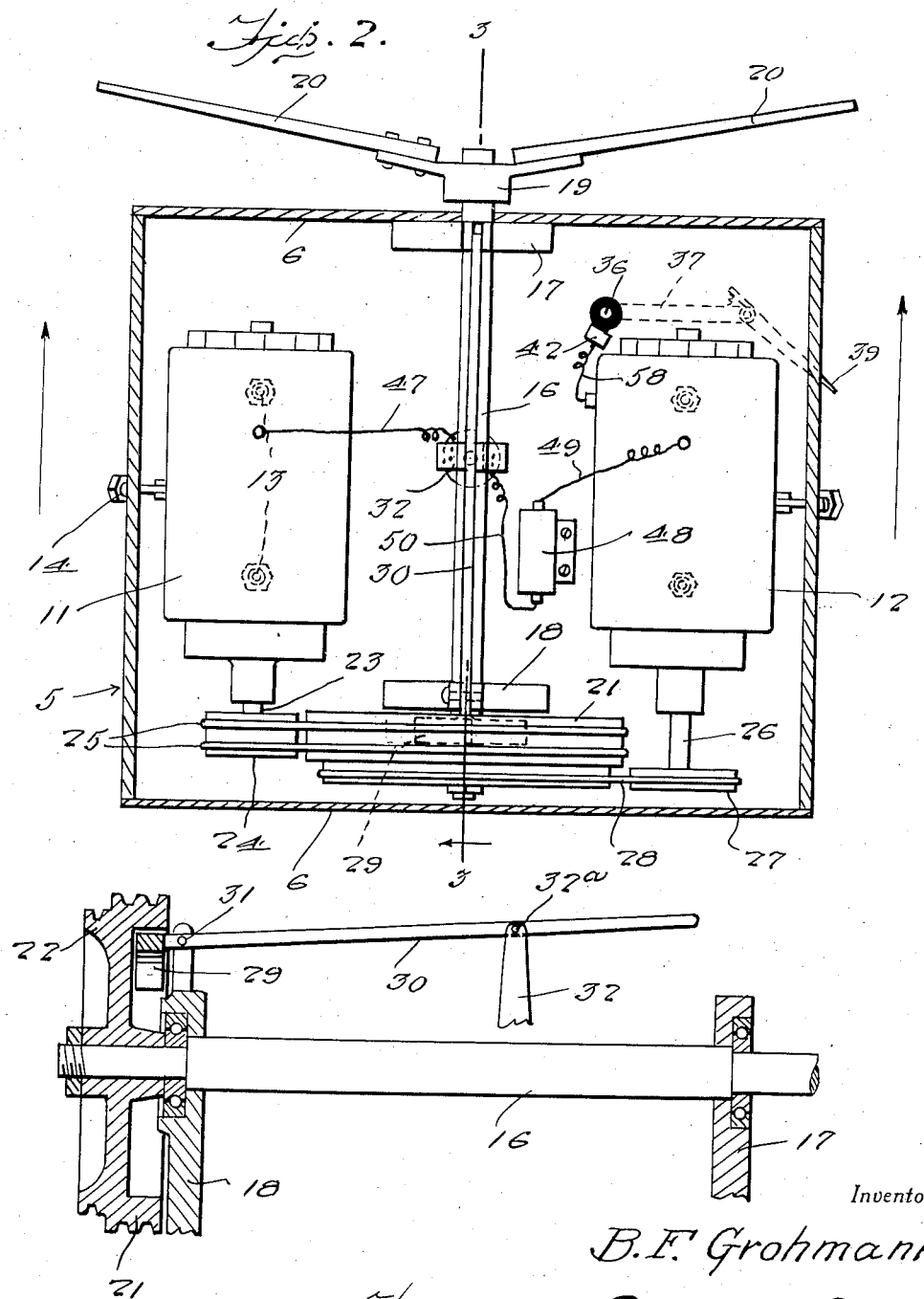

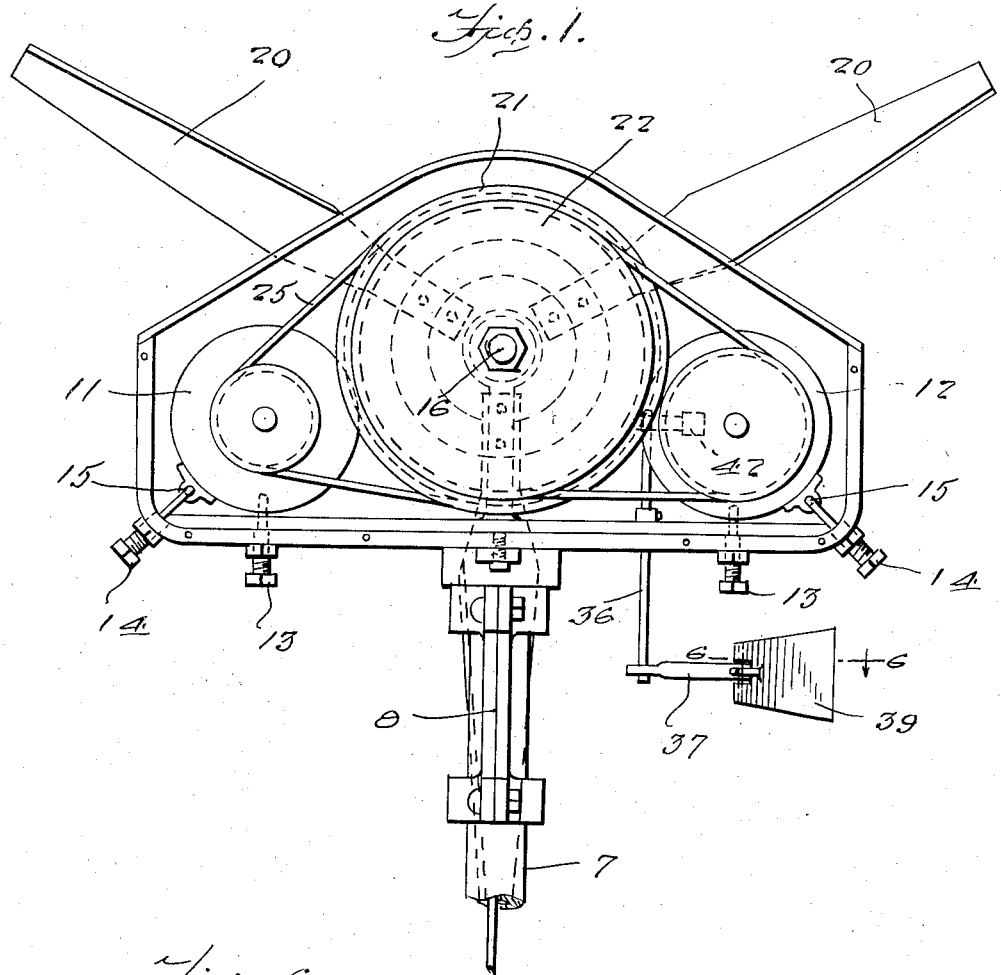
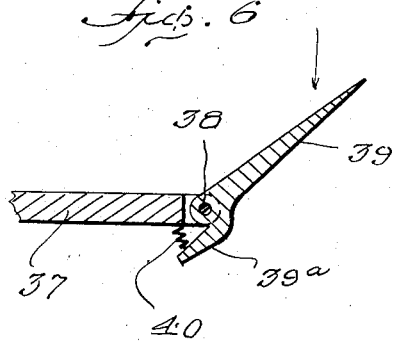

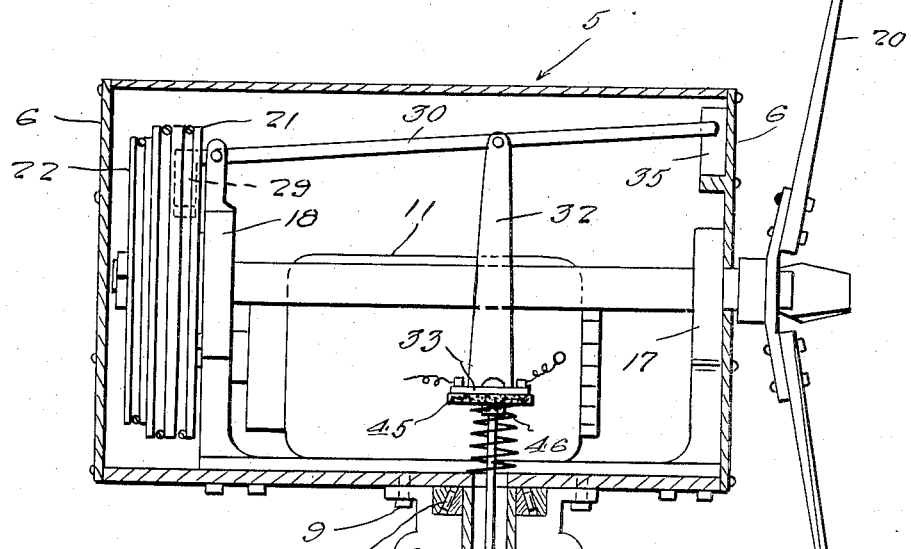
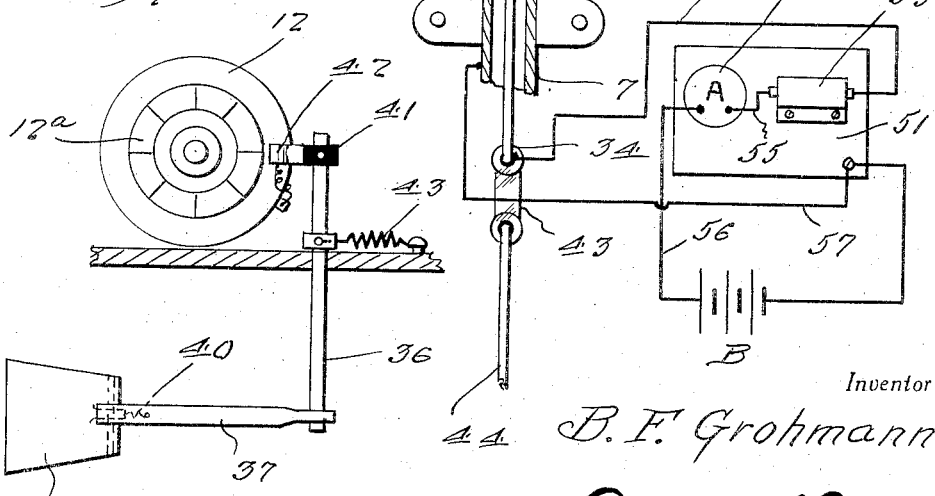

Patented Jan. 31, 1939

2,145,511

UNITED STATES PATENT OFFICE 2,145,511

WIND DRIVEN BATTERY CHARGER

Benjamin F. Grohmann, Freeburg, Ill.

Application March 1, 1938, Serial No. 193,374

1 Claim. (Cl. 290—44)

This invention is a device for charging batteries and an object of the invention is to provide a device for this purpose that is equipped so as to be driven by the wind.

A further object of the invention is to provide a wind-driven device for maintaining batteries charged and which consequently will be found especially useful on farms for keeping batteries used with radios, lights, and the like fully charged.

The invention together with its objects and advantages will be best understood from a study of the following description taken in connection with the accompanying drawings wherein:

Figure 1 is an elevational view showing my improved battery charger,

Figure 2 is a view mostly in top plan but with the casing shown in horizontal section, Figure 3 is a vertical sectional view taken substantially on the line 3—3 of Figure 2, Figure 4 is a fragmentary detail elevational view showing a brake mechanism hereinafter more fully referred to, Figure 5 is a detail view mostly in elevation showing a wind-operated device for placing one of the generators in operation, Figure 6 is a fragmentary detail sectional view taken substantially on the line 6—6 of Figure 1.

Referring to the drawings by reference numerals it will be seen that in accordance with the present invention I provide a casing 5 preferably formed of cast iron and equipped at the respective opposite ends thereof with removable end plates 6 preferably of heavy galvanized iron.

The casing 5 is mounted on a suitable support or mast 7 for free rotation upon the post through the medium of a two-part bracket 8 bolted or otherwise secured as at 9 to the bottomside of the casing 5 and provided in the upper end thereof with a bearing 10 as shown.

Housed within the casing 5 are two generators, 11 and 12, respectively.

Each generator 11, 12 is mounted for suitable adjustment within the housing through the medium of adjusting screws 13 threaded through the bottom of the housing, and adjusting screws 14 threaded through the housing at the junction of the bottom and vertical side walls thereof. The screws 14 have suitable swivel connections 15 with the casings of the respective generators, and screws 14 serve for adjusting the generators as desired for increasing or taking up slack in belts 26 and 28 hereinafter more fully referred to.

A shaft 16 is horizontally supported in the casing through the medium of bearing brackets 17, 18 provided therefor within the casing, and at one end thereof the shaft 16 extends through an end wall of the casing and has mounted thereon the hub 19 of a wind wheel which also includes vanes or blades 20 suitably secured to the hub 19.

Mounted on the inner end of the shaft 16 is a double pulley including a pulley 17 of one diameter and an integral pulley 18 of a smaller diameter.

The generator 11 is provided on one end of the shaft 23 thereof with a grooved pulley 24 over which are trained the aforementioned drive belts 25, said belts being also trained over the large diameter pulley 21.

On the shaft 26 of the generator 12 is provided a grooved pulley 27 over which is trained the aforementioned drive belt 28 and said belt 28 is also trained over the small diameter pulley 22. It will thus be seen that the shafts of the generators are driven from the wind wheel shaft 16 as the latter rotate.

For applying, when desired, a braking action to the pulleys 21, 22 there is provided a brake shoe 29 accommodated within the confines of the flange of the large diameter pulley 21 and mounted on one end of a rod 30 that is pivotally mounted as at 31 on the bearing standard 18 as shown in Figure 4.

The free end of the lever works in a suitable guide 35 provided on one of the end plates 6 as shown in Figure 3.

A conductor plate 33 is suitably secured to the lower end of a pair of pull links 32 which are disposed at opposite sides of shaft 16 and at their upper ends are pivoted as at 32a in an intermediate portion of the brake lever 30. A conductor rod 34 has a headed end thereof engaged with the plate 33 and extends downwardly through the mast or standard 7. At its lower end the rod 34 is connected through the medium of a suitable insulator 43 with a pull cord 44. Disposed against the underside of the plate 33 and about the rod 34 is a disk 45 of insulating material. Disposed on the rod 34 and interposed between the disk 45 and the bottom of the casing 5 is a coil spring 46. Spring 46 normally acts on the plate 45 and associated parts to urge the lever 30 to the position shown in Figure 3, in which position brake shoe 29 is out of frictional contact with the pulley 21. It will thus be seen that by pulling downwardly on the cord 44 lever 30 will be cause to rock on its pivot 31 thus moving the brake shoe 29 into frictional engagement with the pulley 21 for applying a braking action to the wind wheel shaft 16.

As clearly shown in Figure 2, and for obtaining current from the generator 11, the latter is electrically connected with the conductor disk 33 through the medium of a conduit wire 47. Also, and as clearly shown in Figure 2 there is suitably mounted within the casing 5 a cut-out 48 one side of which is electrically connected with the generator 12 through the medium of a wire 49 while the other side of the cut-out 48 is connected with the conductor disk 33 through the medium of a conductor wire 50.

As shown in Figure 3 there is suitably provided at some desired location a galvanized plate 51, an ammeter 52, and a cut-out 53. One side of the cut-out 53 is connected through the medium of a wire 54 with the conductor rod 34 while the other side of the cut-out 53 is connected through the medium of a wire 55 with one side of the ammeter 52. The other side of the ammeter 52 is connected through the medium of a wire 56 with one side of the battery B that is to be charged. The other side of the battery B is connected through the medium of a wire 57 with the plate 51 and which wire 57 is also connected to the mast 7 which is of metal and forms a ground.

It will thus be seen that normally when the device is in operation current from the generator 11 is supplied to the batery B for charging the latter.

Also, as apparent from the above, the generator 12 normally idles and is only brought into operation for supplying current to the battery when the wind is strong enough to act on a governor shown in Figure 5 and which consists, as shown in said figure, of a vertical shaft 36 journaled in the bottom of the casing 5 and provided at its lower end with an arm 37 to which is pivoted as at 38 a vane 39. At the pivoted end thereof the vane 39 is provided with an abutment lug 39a and interposed between the abutment lug 39a and the adjacent end of the arm 37 is a spring 40 which normally urges the vane 39 to an angular position relative to the arm 37.

On the upper end of the shaft 36 and insulated therefrom as at 41 is a contact brush 42 that is arranged in the path of the armature 12a of generator 12, and is connected with a brush of the generator 12 through the medium of a wire 58. It will thus be seen that normally the brush 42 is held out of contact through the medium of a spring 43 as shown in Figure 5 with the armature 12a of the generator 12. When, however, the wind is strong enough to swing the vane 39 against the action of spring 40 into a position substantially paralleling arm 37 and consequently cause arm 37 together with shaft 36 to rotate in opposition to spring 43 brush 42 will move into contact with the armature 12a of the generator 12 and current from the generator 12 will then be utilized, in addition to the current from the generator 11 for charging the battery B or as many batteries as may be connected with the device for the purpose of being charged.

It will thus be seen that normally the generator 11 will charge during a low wind velocity while generator 12 idles under such conditions. However when the velocity of the wind materially increases generator 12 is also forced into action to supplement the work of the generator 11 in supplying electricity for charging the batteries connected with the device.

It is thought that a clear understanding of the construction, utility, operation and advantages of a wind-driven battery charger embodying the features of the present invention will be had without a more detailed description thereof.

Having thus described the invention what is claimed as new is:

In a device of the character described, a support, means mounted on the support for free rotation thereon, a generator mounted on said means, a wind wheel shaft mounted on said means, a wind wheel on one end of said shaft, power transmission mechanism connecting said shaft with the generator, a vertical shaft journaled on said means adjacent said generator, a contact brush mounted on said vertical shaft for movement into and out of engagement with an armature of said generator, an arm secured to said vertical shaft and extending at right angles thereto, a wind vane pivoted on the free end of said arm and including a lug on the pivoted end thereof, and an expansion spring engaging the lug and arm for urging the vane in a direction opposite to the direction of the wind, said lug coacting with the arm in limiting the pivotal movement of the vane in one direction.

BENJAMIN F. GROHMANN.